(12) United States Patent
Wong et al.

(10) Patent No.: US 9,275,033 B2
(45) Date of Patent: Mar. 1, 2016

(54) SYSTEM, METHOD AND COMPUTER PROGRAM PRODUCT FOR CREATING AN OBJECT WITHIN A SYSTEM, UTILIZING A TEMPLATE

(75) Inventors: Simon Wong, San Carlos, CA (US); Sonali Agrawal, San Carlos, CA (US)

(73) Assignee: salesforce.com, inc., San Francisco, CA (US)

( * ) Notice: Subject to any disclaimer, the term of this patent is extended or adjusted under 35 U.S.C. 154(b) by 229 days.

(21) Appl. No.: 13/072,631

(22) Filed: Mar. 25, 2011

(65) Prior Publication Data

US 2011/0238707 A1 Sep. 29, 2011

Related U.S. Application Data

(60) Provisional application No. 61/317,666, filed on Mar. 25, 2010.

(51) Int. Cl.
*G06F 7/00* (2006.01)
*G06F 17/24* (2006.01)

(52) U.S. Cl.
CPC .................................. *G06F 17/248* (2013.01)

(58) Field of Classification Search
None
See application file for complete search history.

(56) References Cited

U.S. PATENT DOCUMENTS

| | | | |
|---|---|---|---|
| 5,386,557 A * | 1/1995 | Boykin | G06F 17/30371 |
| 5,577,188 A | 11/1996 | Zhu | |
| 5,608,872 A | 3/1997 | Schwartz et al. | |
| 5,630,125 A * | 5/1997 | Zellweger | G06F 17/30994 |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,064,968 A * | 5/2000 | Schanz | 705/311 |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,583 B1 * | 5/2001 | Hoth | G06F 17/30398 707/752 |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |

(Continued)

OTHER PUBLICATIONS

U.S. Appl. No. 60/828,192, filed Oct. 4, 2006.

*Primary Examiner* — Fred I Ehichioya
*Assistant Examiner* — Hasanul Mobin

(57) ABSTRACT

In accordance with embodiments, there are provided mechanisms and methods for creating an object within a system, utilizing a template. These mechanisms and methods for creating an object within a system, utilizing a template can enable increased efficiency, resource and time savings, more intuitive object creation, etc.

9 Claims, 4 Drawing Sheets

(56) References Cited

U.S. PATENT DOCUMENTS

| | | |
|---|---|---|
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,076,490 B2 * | 7/2006 | Park et al. |
| 7,181,758 B1 | 2/2007 | Chan |
| 7,209,929 B2 | 4/2007 | Dominguez, Jr. et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,529,734 B2 * | 5/2009 | Dirisala ............ G06F 17/30398 |
| 7,620,655 B2 | 11/2009 | Larsson et al. |
| 7,698,160 B2 | 4/2010 | Beaven et al. |
| 7,779,039 B2 | 8/2010 | Weissman et al. |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,457,545 B2 | 6/2013 | Chan |
| 8,484,111 B2 | 7/2013 | Frankland et al. |
| 2001/0044791 A1 | 11/2001 | Richter et al. |
| 2002/0002614 A1 * | 1/2002 | Murphy ................ G06F 9/465 709/226 |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0087560 A1 * | 7/2002 | Bardwell ................. G09B 7/00 |
| 2002/0129017 A1 * | 9/2002 | Kil .................... G06F 17/30539 |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0233404 A1 | 12/2003 | Hopkins |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0223022 A1 | 10/2005 | Weissman et al. |
| 2005/0283478 A1 | 12/2005 | Choi et al. |
| 2006/0021019 A1 | 1/2006 | Hinton et al. |
| 2006/0206834 A1 | 9/2006 | Fisher et al. |
| 2007/0203929 A1 * | 8/2007 | Bolivar ............. G06F 17/30672 |
| 2007/0203935 A1 * | 8/2007 | de Souza ............... G06Q 10/10 |
| 2008/0249772 A1 | 10/2008 | Dillon |
| 2009/0063415 A1 | 3/2009 | Chatfield et al. |
| 2009/0100342 A1 | 4/2009 | Jakobson |
| 2009/0125830 A1 * | 5/2009 | Marcek et al. ................. 715/771 |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

* cited by examiner

SYSTEM, METHOD AND COMPUTER PROGRAM PRODUCT FOR CREATING AN OBJECT WITHIN A SYSTEM, UTILIZING A TEMPLATE

CLAIM OF PRIORITY

This application claims the benefit of U.S. Provisional Patent Application 61/317,666, entitled "Base Platform Objects," by Wong et al., filed Mar. 25, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to object creation, and more particularly to creating objects utilizing a template.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Conventional systems (e.g., multi-tenant on-demand database systems, etc.) may utilize one or more objects to facilitate system usage by one or more tenants of the system. For example, the objects may be used to enable report generation within the system, data manipulation within the system, etc. Unfortunately, the creation of these objects has been associated with various limitations.

Just by way of example, systems may utilize a significant amount of resources during the creation of objects within the system. For instance, each object within the system may need to be individually created and have its parameters manually established. Accordingly, it is desirable to optimize the creation of objects within a system.

BRIEF SUMMARY

In accordance with embodiments, there are provided mechanisms and methods for creating an object within a system, utilizing a template. These mechanisms and methods for creating an object within a system, utilizing a template can enable increased efficiency, resource and time savings, more intuitive object creation, etc.

In an embodiment and by way of example, a method for creating an object within a system, utilizing a template is provided. In one embodiment, a request is received to create an object within a system. Additionally, the object is created within the system, utilizing a template. Further, the object is distributed to all tenants of the system.

While one or more implementations and techniques are described with reference to an embodiment in which creating an object within a system, utilizing a template is implemented in a system having an application server providing a front end for an on-demand database system capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are pr vided for creating an object within a system, utilizing a template.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for creating an object within a system, utilizing a template will be described with reference to example embodiments.

Figure 1:
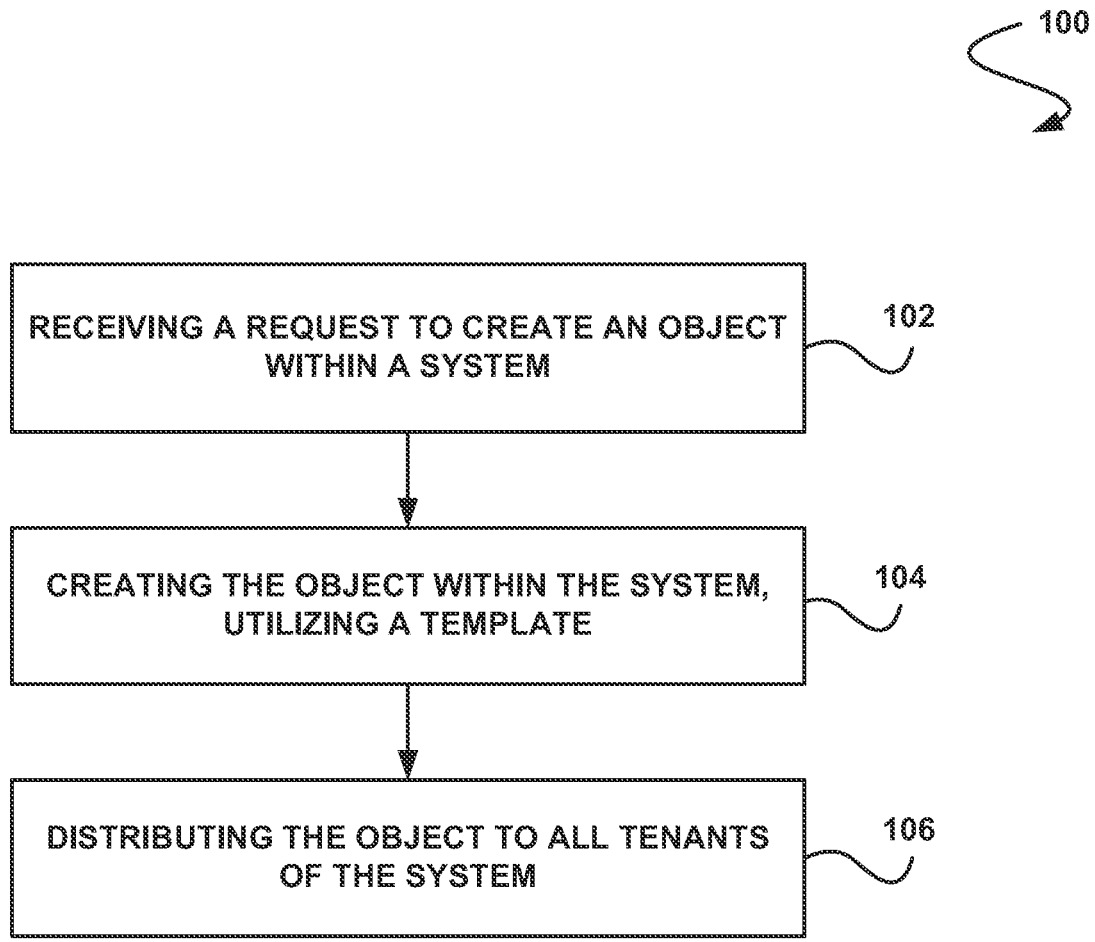
FIG. 1 illustrates a method for creating an object within a system, utilizing a template, in accordance with one embodiment.

FIG. 1 illustrates a method 100 for creating an object within a system, utilizing a template, in accordance with one embodiment. As shown in operation 102, a request is received to create an object within a system. In one embodiment, the request may be received at the system. In another embodiment, the system may include a client, a server, a multi-tenant on-demand database system, etc. In yet another embodiment, the request may be sent by a user of the system (e.g., a tenant of the system, etc.), a developer of the system, etc. In still another embodiment, the request may be sent utilizing an interface (e.g., a graphical user interface, etc.).

Additionally, in one embodiment, the object may include any item associated with the data of a system. For example, the object may enable data management within the system, data manipulation within the system, data storage within the system, etc. In another embodiment, the object may include a standard object within the system. For example, the object may include an object accessible by all users (e.g., organizations, etc.) within the system. In another example, the standard object may have one or more standardized system platform behaviors. In yet another embodiment, the object may include an entity, a receipt, a quote, a line item, an address, etc.

Further, it should be noted that, as described above, such multi-tenant on-demand database system may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database system will be set forth in the context of different embodiments that will be described during reference to subsequent figures.

Further still, as shown in operation 104, the object is created within the system, utilizing a template. In one embodiment, the template may include a standard template entity. For example, the template may include a standard template object with one or more low-level parameters, standard system fields, etc. In another embodiment, one or more standard system fields of the template may be predefined. In yet another embodiment, one or more platform features of the system may be supported by the template.

Also, in one embodiment, the template may be created by an entity associated with the system. For example, the template may be created by a customer of the system, an administrator of the system, etc. In another embodiment, the template may be created utilizing an interface (e.g., a graphical user interface (GUI), etc.). In yet another embodiment, the object may be associated with a platform of the system. For example, the object may include a platform entity of the system, etc.

In addition, in one embodiment, the template may be used as the basis for the object. In another embodiment, the object may inherit one or more characteristics from the template. For example, the object may inherit one or more of standard fields and standard features from the template. In another embodiment, the object may include an identifier. For example, the object may include a distinct key prefix. In another example, the key prefix may start with a digit. In yet another example, the key prefix may indicate a type of the object.

Further, in one embodiment, the object may be stored in a database of the system once it is created. For example, the object may be stored within a single database table that stores all objects created within the system. In another embodiment, creating the object may include creating a subclass for the object. For example, a concrete subclass may be created for the object that may handle one or more of the loading of the object, the saving of the object, etc. In yet another embodiment, the object may include a plurality of fields. For example, a pool of standard fields may be implemented for the object. In another embodiment, one or more of the plurality of fields may be initialized (e.g., given a value, activated, deactivated, etc.) utilizing metadata.

Further still, as shown in operation 106, the object is distributed to all tenants of the system. In one embodiment, the tenants of the system may include the customers of the system, the clients of the system, the users of the system, etc. In another embodiment, distributing the object to all tenants of the system may include making the object available for use by all tenants of the system. For example, the system may include a multi-tenant on-demand database system, and the object may be made available to all tenants of the multi-tenant on-demand database system. In this way, the creation of the object may be simplified within the system environment. Additionally, the time taken to create objects within the system may be reduced. Further, standard and consistent behavior may be enforced across all objects at a core level of the system.

Figure 2:
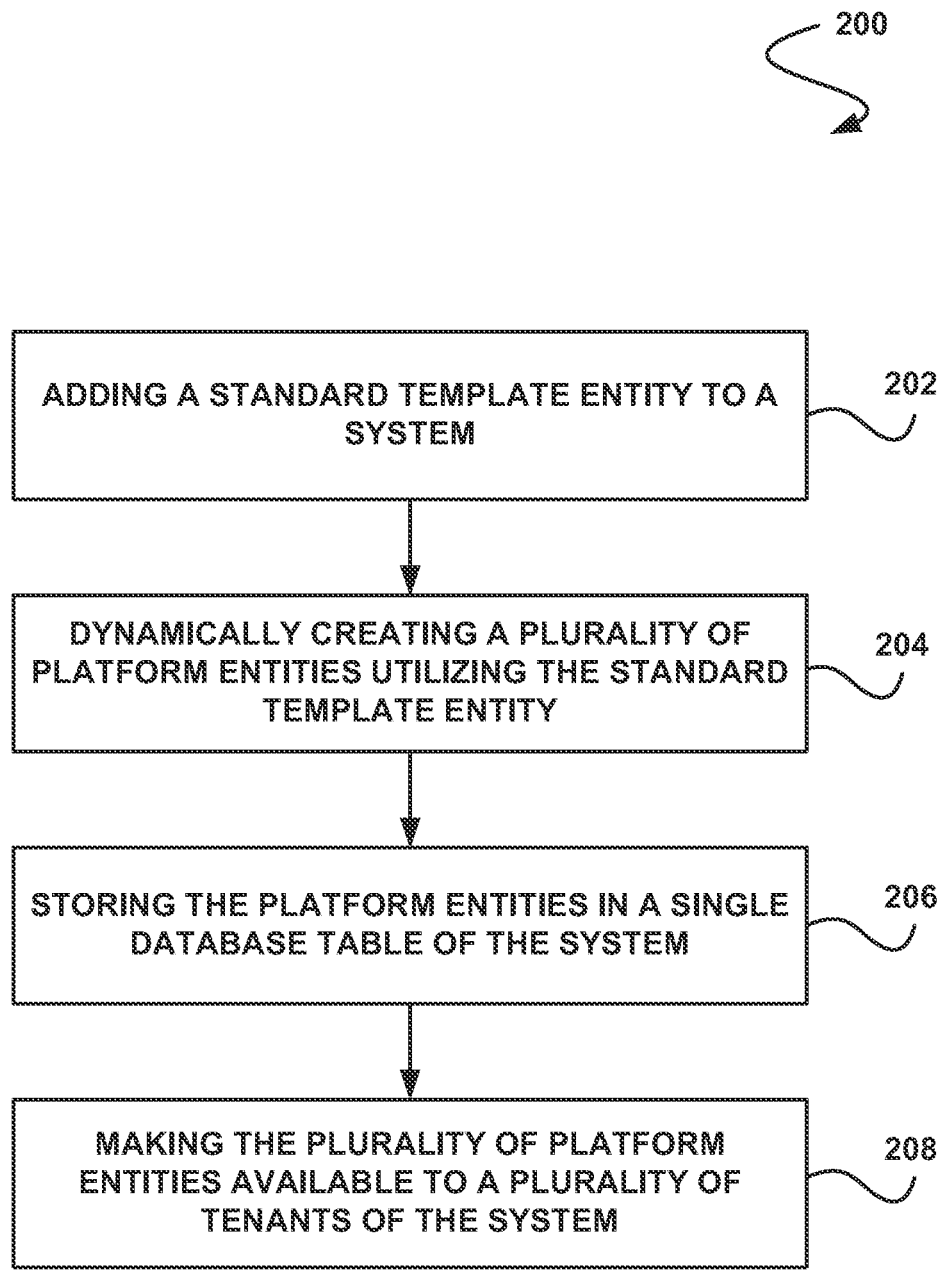
FIG. 2 illustrates method for creating a plurality of platform entities, in accordance with another embodiment.

FIG. 2 illustrates a method 200 for creating a plurality of platform entities, in accordance with another embodiment. As an option, the method 200 may be carried out in the context of the functionality of FIG. 1. Of course, however, the method 200 may be carried out in any desired environment. The aforementioned definitions may apply during the present description.

As shown in operation 202, a standard template entity is added to a system. In one embodiment, the standard template entity (e.g., a standard template object, etc.) may be added to an extensible markup language (XML) file (e.g., udd.xml, etc.) of the system. In another embodiment, one or more low-level system parameters may be specified within the standard template entity. For example, one or more standard fields may be defined for the standard template entity, such as a primary key, a RecordTypeId, a CurrencyIsoCode, audit fields, flex fields, etc.

In yet another embodiment, the standard template entity may support one or more flex fields. For example, the standard template entity may support one or more flex fields of data type TEXT, MULTILINETEXT, STRINGPLUSCLOB, EMAIL, PHONE, FAX, URL, INTEGER, DOUBLE, PERCENT, CURRENCY, DYNAMICENUM, MULTIENUM, DATEONLY, DATETIME, ENTITYID, etc.

Additionally, as shown in operation 204, a plurality of platform entities is dynamically created utilizing the standard template entity. In one embodiment, each of the plurality of platform entities e.g., platform objects, etc.) may automatically inherit one or more of the standard fields defined for the standard template entity. In another embodiment, the plurality of platform entities may be created utilizing abuse platform object (BPO) framework. In yet another embodiment, each platform entity may be defined within an XML filed of the system using one or more new keywords. Table 1 illustrates an exemplary platform entity definition. Of course, it should be noted that the definition shown in Table 1 is net forth for illustrative purposes only, and thus should not be construed as limiting in any manner.

TABLE 1

```
<platformEntity name="Bogus" keyPrefix="0E3"
owner="someNewHire" orgAccess="orgHasSomeNewPerm">
    <flexField name="Field1" slot="0" columnType="TEXT"
maxLength="255" dbValueRequired="true"/>
    <flexField name="Field2" slot="1" columnType="INTEGER"/>
    <flexField name="Field3" slot="2" columnType="ENTITYID"
domain="Account" isMasterDetail="true"/>
</platformEntity>
```

Further, in one embodiment, there may be some overlap with the existing attributes on <entity> and <field>. In this way, the new keywords may simplify parsing, and may also make documentation in udd.xsd easier. In another embodiment, a parser of the XML file may be enhanced to merge the standard template entity with the platform entity definitions to generate Java and plsql code in Entities.java, Bogusfields.java, gKeyPrefixes_h.sql, cUddMetadata.sql, etc., as if they are any other standard entities. This may allow programmatic references to the platform entities and flex fields in generic, generated, or hand-written Java/plsql code. Additionally, the parser of the XML file may be enhanced to generate one or more of EntityCommon and FieldCommon instances at appserver startup time. In other words, they may behave like any other standard entities at the udd level.

Table 2 illustrates one or more possible relationships between the plurality of platform entities and other entities. Of course, it should be noted that the possible relationships shown in Table 2 are set forth for illustrative purposes only, and thus should not be construed as limiting in any manner.

TABLE 2 optional master-detail relationships:

child platform entity as m/d child of (i.e. has flex m/d field to) a standard entity
child platform entity as m/d child of opportunity and contact which is itself child of account
child platform entity as m/d child of another parent platform entity
child custom entity as m/d child of a top level platform entity
child custom entity as m/d child of a child platform entity which has its own parent
(note, platform entities may be like standard entities in that custom m/d fields may not be able to be created on them)
optional lookup relationships:

standard entity has standard lookup fk field to platform entity
platform entity has flex lookup fk field to standard entity
platform entity has flex lookup fk field to platform entity
platform entity has custom lookup fk field to standard entity
platform entity has custom lookup fk field to custom entity
platform entity has custom lookup fk field to platform entity
standard entity has custom lookup fk field to platform entity
custom entity has custom lookup fk field to platform entity Additionally, in one embodiment, the platform entities may have master-detail relationships involving locking a parent before children when summaries are present, sharing of a child driven by sharing of parent, cascade delete and cascade undelete behaviors. In another embodiment, having a platform entity be a child of opportunity and then have its own custom child entity may indicate a multi-level master-detail chain from account->opportunity->platform->custom, and this is may not be the longest chain possible. In yet another embodiment, platform entities may not have secondary master-detail relationships. In still another embodiment, lookup relationships may involve cascade set-null on deletes, and subsequent restore on undeletes.

Table 3 illustrates a list of exemplary platform features that the platform entities may support. Of course, it should be noted that the exemplary platform features shown in Table 3 are set forth for illustrative purposes only, and thus should not be construed as limiting in any manner.

TABLE 3 lock correctly
load objects with flex and custom fields (bulk)
save objects with flex and custom fields (bulk)
soft delete (bulk)
undelete (bulk)

TABLE 3-continued flex fields of data types listed above
all types of custom fields (including LTA and foreign keys)
cascade delete, cascade undelete on m/d (flex and custom)
cascade set-null, restore on undelete on lookup (flex and custom)
MLMD via master-detail flex fields
physical delete
storage counts
customizable layout
detail and edit pages
actions, buttons
tab, motif, shown in specific tabsets
list filters
related lists of, customizable in other objects
overview page
list layouts
activity what (no last_activity)
note, attachment, google doc
entity history, choice of flex and custom fields to track history
workflow
approval
formula fields
validation formula
api describe
api access
soql access
apex trigger
access from apex triggers of other objects
metadata API access
visual force access
developers create standard RSFs of platform children fields into master
customers create custom RSFs
owner field, UI to change owner
queue as owner
division, child platform of division enabled object gets division from parent
public and private sharing models, choices of, plsql access checks for sharing providers for platform entities, platform child entities, and custom child entities of platform entities
CRUD, FLS
record type, layout mapping for profiles
standard picklists vs static picklist values for flex fields
dependent picklists
picklist rename and picklist replace on custom and flex picklist fields
convert custom fields from text to picklist, picklist to text, picklist to checkbox, picklist to msp, msp to picklist, etc
autonumber custom fields, initial population, pk-chunking
search, ability to configure searchable fields, search LTA flex fields
developers write standard reports
customers write custom reports
support in custom report types
custom index for flex fields
tags
teams
UI help
weekly exports
TI copy
org migration Table 4 illustrates exemplary available options for the platform entities. Of course, it should be noted that the options shown in Table 4 are set forth for illustrative purposes only, and thus should not be construed as limiting in any manner.

TABLE 4

Standard Fields of all types (other than auto-number)
Custom Fields of all types
Multi level master detail
Validation Formulas
Apex triggers and classes
VisualForce
Workflow Rules and Actions
Approval Processes
Standard Reports
Activities
Notes, Attachments, Google Docs
CRUD TABLE 4-continued Standard Summary Fields
Page Layouts (e.g., Detail page, edit page, printable view, etc.)
Derived Fields
Master-detail miscellaneous:
Remove Owner field for Child objects
Remove Division field if parent is not Division-enabled
Page Layouts misc. (related lists, embedding in VF)
Custom Buttons and Action Overrides
Name field misc. (increase length to >80 chars; ability to change API name and label; ability to make it read-only)
Settings to control individual fields properties (Editability, WF, etc.)
Field level security
Developer defined indexes
Searchability and Search Layouts
Address fields
Record Types
Name as auto number
Misc. new requirements for Quotes
Standard Field as Auto number
Setting to make CurrencyISOCode field non standard
Misc. new requirements for Discussions
Turning OFF Approval Rules and WFs for Discussions
Testing of Sharing
Testing of Infrastructure
Testing of Common features
Storage Count
Weekly Export
TI Copy
Org Migration
Physical Delete
DOT-ing support
Field history tracking
Testing of CRTs
BPO: Standard Junction Objects on BPOs
BPO: TLO - Basic Object
BPO: TLO -- Basic Object
BPO: Static Picklists
BPO: Record Types
BPO: Filtered Lookups
BPO: Inline editing
BPO: ACM Support (w/SFA)
BPO: Bulk Load hook for Quotes
BPO: Auto number reset within each parent
BPO: Standard Junction Objects on BPOs
Record Types
CJOs as BPOs
Top level objects as BPOs (owner related work, queues)
Sharing (for top-level object)
Customizable sharing model, private/public, manual shares
S2S
Mobile
Exposure in Portals and Sites
Divisions
Filtered lookups
Enhanced list views
Inline editing
Tags
Teams
ACM (advanced currency mgmt)
Static picklists Additionally, in one embodiment, the platform entities may be created utilizing metadata. For example, a developer in the system may create a platform entity my writing one or more lines in an XML file (e.g., udd.xml, etc.) that assign values to one or more fields within the platform entity, denote that one or more features of the platform entity are supported or not supported, etc. In this way, the metadata may define one or more aspects of the platform entity. In another embodiment, features such as search query, reporting, apex triggers, visualforce, etc, may be implemented in the framework of the standard template and may not have to be individually implemented for each of the platform entities.

Further still, as shown in operation 206, the platform entities are stored in a single database table of the system. In one embodiment, the single database table may include a plurality of columns that are allocated for one or more standard fields of the platform entities. In another embodiment, each platform entity may have a unique key prefix that identifies that entity within the database table. In yet another embodiment, metadata drafted by a developer to describe the platform entities may be interpreted at runtime (e.g., by an interpreter, etc.), and may get mapped to one or more portions of the single database table.

In another embodiment, the plurality of platform entities may be created and stored in a manner similar to those of custom entities (e.g., custom objects, etc.). See, for example, U.S. patent application Ser. No. 10/817,161, filed Apr. 2, 2004, which describes exemplary techniques for custom object creation.

Additionally, in one embodiment, a new database table (e.g., core.standard_entity_data, etc.) may be created. In another embodiment, the database table may have an the columns in core.custom_entity_data, plus a predetermined amount of new columns (e.g., fifty columns called std0 through std49 for up to 50 flex fields, minus the columns last_activity and setup_owner, etc.). All platform entities defined using <platformEntity> may be stored in this table, despite having distinct key prefixes. If more flex fields are desired, the table may be redefed to add more. In another embodiment, flex and custom fields may be interleaved in order to maximize the chances that for any platform object, all relevant fields will belong to the first 255 columns in the table. This may minimize oracle row-chaining. In yet another embodiment, data may be stored in this table in a manner similar to custom fields being stored in varchar2(765) fields.

Further, in one embodiment, the name field may be denormalized (e.g., into core.name_denorm and core.search_name_lookup, etc.). In another embodiment, flex foreign key fields may be denormalized into core.custom_foreign_key_value, and negative index_num values may be used to distinguish them from custom fields. In yet another embodiment, 1's complement. slot 0 may be represented by −1, slot 1 by −2, slot 2 by −3, etc. In still another embodiment, the same negative values may be used to identify the flex field in core.delete_event_foreign_key. This may be the same for long text flex fields, where data beyond the 255th character may be stored in a separate table. And this may be the same for custom indexes on flex fields. In another embodiment, all the denormalized tables may be maintained synchronously during each save/delete/undelete operation, etc.

Further still, as shown in operation 208, the plurality of platform entities are made available to a plurality of tenants of the system. For example, all tenants of a multi-tenant on-demand database system may be able to access the plurality of platform entities. In this way, standard object creation may need to be done only once by drafting the standard template entity (e.g., within the BPO infrastructure, etc.), and the creation of each platform entity may only necessitate the use of metadata to detail behavior within the BPO platform, thereby avoiding the need to write code for each platform entity.

Also, in one embodiment, a concrete subclass of EntityObject may be created for platform objects, which may handle the regular loading and saving of all platform objects. It may call into one set of plsql methods to load or save objects, just like custom objects. However, additional feature functionality is desired, concrete subclasses may be created for individual platform objects, and existing java hooks may be overridden. For example, flex fields may be referred to using the generated java UddId constants, and they may be manually updated in java.

In another embodiment, when bulk inserting platform objects, plsql may insert all 50 flex field slots and 501 custom field slots together with all standard fields in one FORALL plsql insert statement. In yet another embodiment, just the standard fields may not be inserted, followed by an update to update the custom fields, to avoid oracle row chaining. And multiple variations of insert statements may be avoided for different number of custom fields. When bulk updating platform objects, the standard fields may be updated in one FORALL plsql update statement, then the custom fields may be updated in another FORALL plsql update statement. There may be a plurality of variations (20, 100, 300, 501) of update statements for different number of custom fields, and there are 2 variations for standard fields (15, 50).

With the addition of platform objects and knowledge article abstract entities (and with the possibility of adding custom fields to the standard table of CampaignMember), multiple combinations may be available for having or not having key_prefix in the table, having or not having a separate custom field table, etc. Additionally, all plsql where we test if a key_prefix is custom may be examined, and may be replaced with cUddMetadata.has_custom_field_table( ) and the new cUddMetadata.is_key_prefix_in_table( ) where appropriate. This may provide for one code path using execute immediate for all tables despite the combinations. For example, see RowLock.sql. Several generic functions may be affected, such as picklist replace, autonumber population, pk-chunking, etc.

In this way, standard objects that support standardized platform behaviors may be created in a simplified way. Developers may not need to write any plsql to achieve basic functionality such as loading into and saving from EntityObjects, having custom fields, standardized sharing checks, etc. Many platform behaviors such as workflow, standard summary fields, apex triggers, API and SOQL exposure, visual force support, etc. may involve also no or very minimum java code.

System Overview

Figure 3:
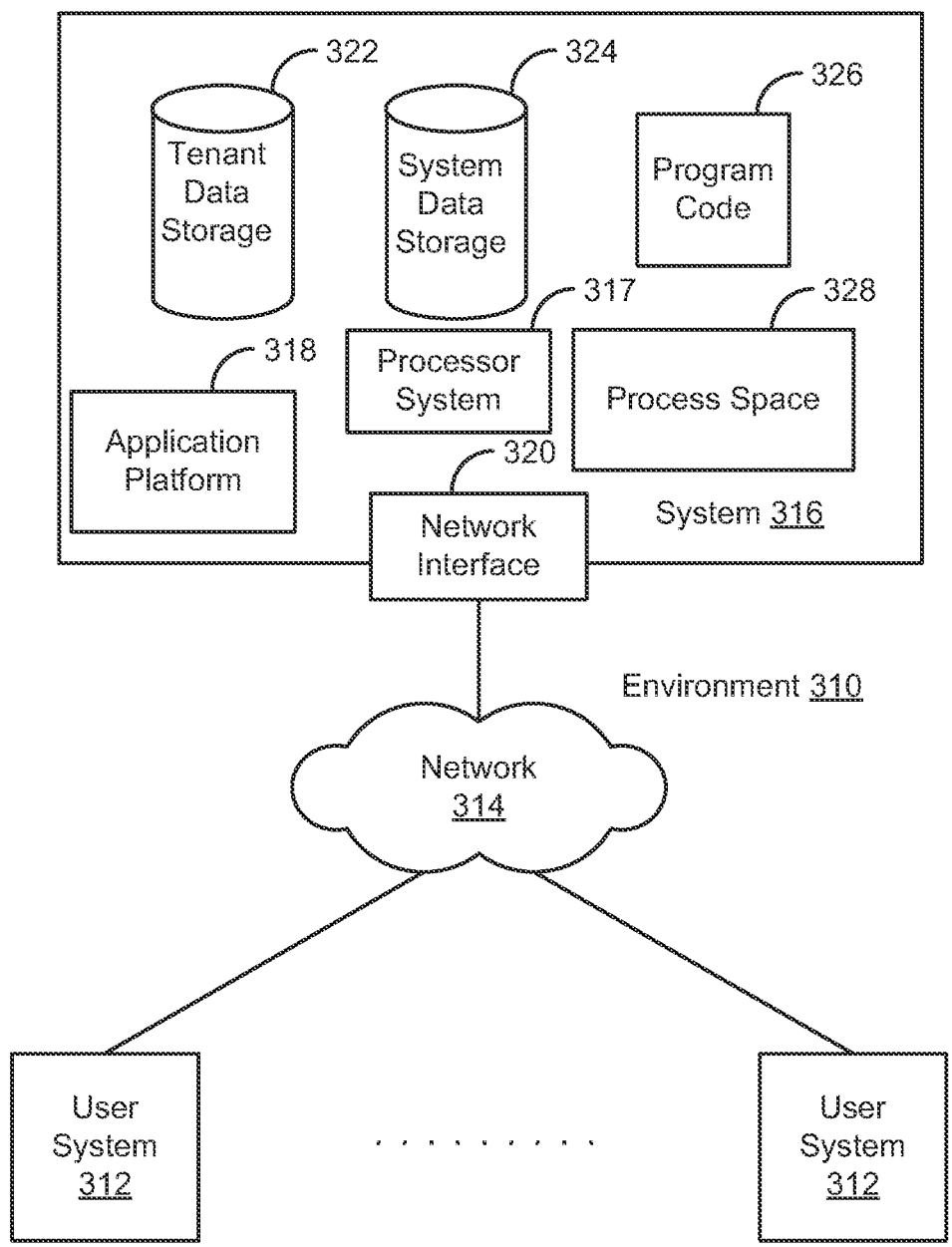
FIG. 3 illustrates a block diagram of an example of an environment wherein an on-demand database system might be used.

FIG. 3 illustrates a block diagram of an environment 310 wherein an on-demand database system might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database system exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database system, which is system 316.

An on-demand database system, such as system 316, is a database system that is made available to outside users that do not need to necessarily be concerned with building and/or maintaining the database system, but instead may be available for their use when the users need the database system (e.g., on the demand of the users). Some on-demand database systems may store information from one or more tenants stored into tables of a common database image to form a multi-tenant database system (MTS). Accordingly, "on-demand database system 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database system 316 may include an application platform 318 that enables creation, managing and executing one or more applications developed by the provider of the on-demand database system, users accessing the on-demand database system via user systems 312, or third party application developers accessing the on-demand database system via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content.

With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language. Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
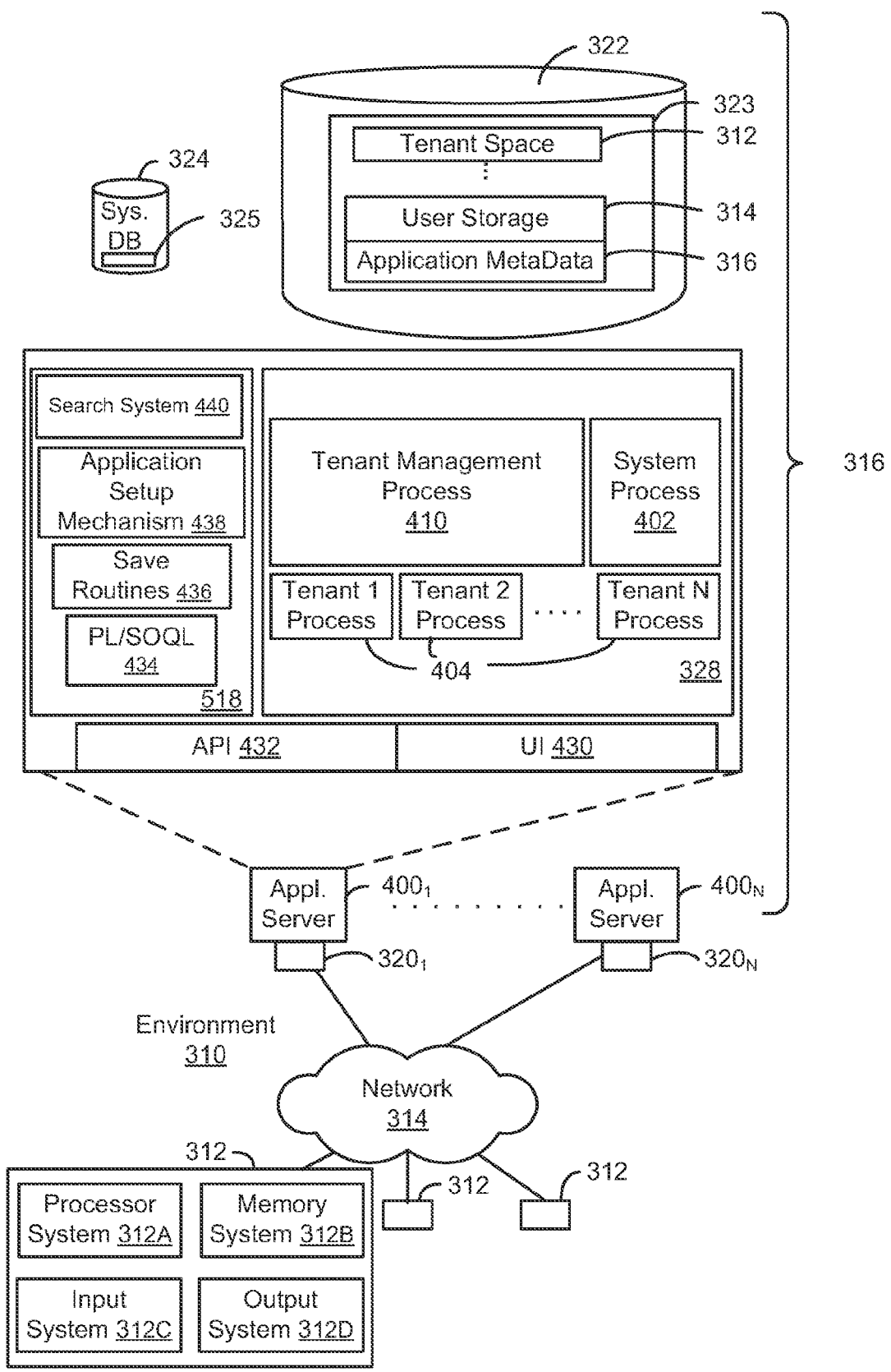
FIG. 4 illustrates a block diagram of an embodiment of elements of FIG. 3 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325. User Interface (UI) 430, Application Program Interface (API) 432, PL/SOQL 434, save routines 436, application setup mechanism 438, applications servers 400₁-400ₙ, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output, devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 434 that provides a programming language style interface extension to API 432. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server 400₁ might be coupled via the network 314 (e.g., the Internet), another application server 400ₙ₋₁ might be coupled via a direct network link, and another application server 400ₙ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information, System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product, comprising a non-transitory machine-readable storage medium having a computer readable program code embodied therein, the computer readable program code adapted to be executed to implement a method for creating an object within a system, utilizing a template, the method comprising:
providing a database system shared by multiple customers, wherein the database system stores standard tables each accessible to and shared by the multiple customers and custom tables each specific to and accessible by a particular one of the customers;
storing, by the database system, a template for a standard table, the template having standard fields and standard features, and a framework of the template implementing at least a search query feature, a reporting feature, apex triggers, and Visualforce;
receiving, by the database system, a request to create a new standard table within the database system from the template;
in response to the request, creating automatically, by the database system, at least:
the new standard table from the template by including in the new standard table the standard fields and standard features of the template and by implementing in the new standard table at least the search query feature, the reporting feature, the apex triggers, and the Visualforce, and
a subclass for the new standard table which handles at least loading of the new standard table and saving of the new standard table within the database system;
storing, in the database system, the created standard table and the created subclass using the database system; and
making, by the database system, the stored standard table available for use by the multiple customers via the subclass, including:
when a search query is received through the stored standard table by one of the customers, executing by the database system the search query to return to the customer results of the execution of the search query; and
when a request for a report is received through the stored standard table by one of the customers, executing by the database system the report to return to the customer a result of the execution of the report.

2. The computer program product of claim 1, wherein the database system includes a multi-tenant on-demand database system.

3. The computer program product of claim 1, wherein the standard table includes an identifier.

4. The computer program product of claim 1, wherein the standard table includes a distinct key prefix.

5. The computer program product of claim 1, wherein the standard table is stored in a database of the database system once it is created.

6. The computer program product of claim 1, wherein one or more of the standard fields of the created standard table are initialized utilizing metadata.

7. A method, comprising:
providing a database system shared by multiple customers, wherein the database system stores standard tables each accessible to and shared by the multiple customers and custom tables each specific to and accessible by a particular one of the customers;
storing, by the database system, a template for a standard table, the template having standard fields and standard features, and a framework of the template implementing at least a search query feature, a reporting feature, apex triggers, and Visualforce;
receiving, by the database system, a request to create a new standard table within the database system from the template;
in response to the request, creating automatically, by the database system, at least:
the new standard table from the template by including in the new standard table the standard fields and standard features of the template and by implementing in the new standard table at least the search query feature, the reporting feature, the apex triggers, and the Visualforce, and a subclass for the new standard table which handles at least loading of the new standard table and saving of the new standard table within the database system;

storing, in the database system, the created standard table and the created subclass using the database system; and making, by the database system, the stored standard table available for use by the multiple customers via the subclass, including:

when a search query is received through the stored standard table by one of the customers, executing by the database system the search query to return to the customer results of the execution of the search query, and when a request for a report is received through the stored standard table by one of the customers, executing by the database system the report to return to the customer a result of the execution of the report.

8. An apparatus, comprising:

a database system shared by multiple customers, wherein the database system stores standard tables each accessible to and shared by the multiple customers and custom tables each specific to and accessible by a particular one of the customers; and a processor of the database system for:

storing, by the database system, a template for a standard table, the template having standard fields and standard features, and a framework of the template implementing at least a search query feature, a reporting feature, apex triggers, and Visualforce;

receiving, by the database system, a request to create a new standard table within the database system from the template;

in response to the request, creating automatically, by the database system, at least:

the new standard table from the template by including in the new standard table the standard fields and standard features of the template and by implementing in the new standard table at least the search query feature, the reporting feature, the apex triggers, and the Visualforce, and a subclass for the new standard table which handles at least loading of the new standard table and saving of the new standard table within the database system;

storing, in the database system, the created standard table and the created subclass using the database system; and making, by the database system, the stored standard table available for use by the multiple customers via the subclass, including:

when a search query is received through the stored standard table by one of the customers, executing by the database system the search query to return to the customer results of the execution of the search query, and when a request for a report is received through the stored standard table by one of the customers, executing by the database system the report to return to the customer a result of the execution of the report.

9. The computer program product of claim 6, wherein the one or more of the standard fields are initialized by activating the one or more standard fields utilizing the metadata.

* * * * *